United States Patent
Gajewski

(10) Patent No.: US 11,051,648 B2
(45) Date of Patent: Jul. 6, 2021

(54) POPCORN POT DESIGNED TO GRAVITATE OIL AND KERNELS TO THE CENTER OF HEAT SOURCE

(71) Applicant: Jennifer Lynn Gajewski, Narberth, PA (US)

(72) Inventor: Jennifer Lynn Gajewski, Narberth, PA (US)

(73) Assignee: Jennifer Lynn Gajewski, Philadelphia, PA (US)

( * ) Notice: Subject to any disclaimer, the term of this patent is extended or adjusted under 35 U.S.C. 154(b) by 119 days.

(21) Appl. No.: 16/416,763

(22) Filed: May 20, 2019

(65) Prior Publication Data

US 2020/0113367 A1 Apr. 16, 2020

Related U.S. Application Data

(60) Provisional application No. 62/645,441, filed on Mar. 20, 2018.

(51) Int. Cl.
| | |
|---|---|
| *A47J 27/00* | (2006.01) |
| *A23L 7/183* | (2016.01) |
| *A47J 36/02* | (2006.01) |
| *A23L 5/10* | (2016.01) |
| *A47J 36/08* | (2006.01) |

(52) U.S. Cl.
CPC .............. *A47J 27/002* (2013.01); *A23L 5/12* (2016.08); *A23L 7/183* (2016.08); *A47J 36/02* (2013.01); *A47J 36/08* (2013.01); *A23V 2002/00* (2013.01)

(58) Field of Classification Search
CPC ........... A47J 27/002; A47J 36/02; A47J 36/08
See application file for complete search history.

(56) References Cited

U.S. PATENT DOCUMENTS

| | | | | |
|---|---|---|---|---|
| 4,164,174 A | * | 8/1979 | Wallsten | A47J 36/022 220/23.87 |
| 2012/0282385 A1 | * | 11/2012 | Levy | A47J 43/18 426/510 |
| 2014/0131361 A1 | * | 5/2014 | Schroeder | A47J 37/10 220/573.1 |

\* cited by examiner

*Primary Examiner* — Stephen J Castellano
(74) *Attorney, Agent, or Firm* — Daniel Saul Finnegan

(57) ABSTRACT

A popcorn pot having a curvilinear body providing a paraboloid-shaped cavity for gravitationally concentrating a quantity of un-popped kernels and a depth of oil over a bottom center of the popcorn pot. The curvilinear body provides volumetric containment inside the paraboloid cavity. Integral footing along a lower portion of the popcorn pot stabilizes the curvilinear body over a flat-top heat source so that the bottom center is disposed centrally thereover. The popcorn pot may include a domed lid for covering the opening communicating to the paraboloid-shaped cavity, wherein the lid is adapted to effectuate convection heating within the cavity, thereby providing natural efficiency and universal accessibility with more predictable results than a flat-bottomed pot, while using less oil for healthier results.

16 Claims, 4 Drawing Sheets

POPCORN POT DESIGNED TO GRAVITATE OIL AND KERNELS TO THE CENTER OF HEAT SOURCE

CROSS-REFERENCE TO RELATED APPLICATION

This application claims the benefit of priority of U.S. provisional application No. 62/645,441, filed 20 Mar. 2018, the contents of which are herein incorporated by reference.

BACKGROUND OF THE INVENTION

The present invention relates to popcorn pots and, more particularly, to a popcorn pot designed to gravitate oil and kernels to the center of a flat-top heat source.

When popping popcorn in a flat-bottom pot such as a sauté pan or sauce pot, problematically, kernels can scatter across the flat-bottom, resulting in kernels that burn or do not pop due to two main factors: 1) unconcentrated heat distribution and 2) inadequate oil coverage.

Current stovetop popcorn pots are designed with a flat bottom to conform to the flat top of the burner which, as stated above, causes kernels to scatter and burn if not constantly attended to. Current solutions to the problems associated with the flat-bottom pot involve adding extra parts to keep the contents of the pot in motion, which then adds extra physical labor to effectuate the desired functionality. Such additional parts and labor include a crank for keeping kernels from prolonged direct heat as well as vigorously shaking for the same reason. Furthermore, the flat bottom of these popcorn pots requires a greater quantity of oil to sufficiently coat the kernels, making this naturally healthy, whole-grain snack high in fat and cholesterol.

In short, the current systems do not work well because the flat-bottom popcorn pot is labor intensive, noisy, inefficient, wasteful, and ultimately unpredictable because the quality of the popped popcorn depends not only on the experience level of the person making the popcorn but also on their physical capabilities, as the current solutions are limiting in the case of operability by the physically disabled.

As can be seen, there is a need for a universal popcorn pot designed to naturally gravitate oil and kernels to the center of the heat source by way of a geometry that works with the force of gravity to effectuate its functionality. The popcorn pot embodied by the present invention is naturally efficient because of a curvilinear path of gravity to the center of the heat, where a concentrated depth of oil and kernels can combine, resulting in three main improvements: 1) a consistently maximized percentage of popped kernels, 2) increased efficiency and reduction of labor to make the popcorn that lends consistency to the quality of the end-product, and 3) a smaller quantity of oil, optimizing the health benefits of this whole-grain, gluten-free, naturally low-fat snack.

The present invention has a cast iron, curvilinear, or paraboloid-shaped, body that naturally gravitates the oil and kernels to the center of the heat, forming a deeper reservoir for the oil to submerse the kernels. In a dipstick test, comparing the depth of one cup of liquid in a nine inch diameter flat-bottomed pot to the same amount of liquid in the ten inch round-bottom prototype, the ten inch round-bottom formed an approximately three and a half times deeper reservoir. Based on an x,y coordinate system with an origin of 0",0", the nine inch flat-bottom pot exhibited a vertical difference of 4½", 0" radius at bottom to a 4½", 5/16" radius at liquid surface, while the coordinates of the ten inch round-bottom exhibited a difference of 0", 0" radius at bottom to a 2¾", 1⅛" radius at liquid surface, illustrating that the paraboloid is the more effective geometry for optimizing any proportionally given quantity of liquid, bearing in mind that further vertical displacement of the liquid occurs if adding a solid mass, such is the case with the oil and kernels.

Investigations into the ideal quantity of oil for the paraboloid geometry leads to a two-part acknowledgement of design intent, one pertaining to the subjectivity of taste and one pertaining to the necessity of oil. Taste is a factor in any given snack and while more oil yields a sweeter popcorn best complemented by salt, less oil is bland but healthier. The design of this popcorn pot leaves the subjectivity of taste to the maker and identifies utilitarian function, informed by scientific evidence, to be the primary objective that can make healthy snacking universally accessible and affordable. To this end, scientific research informs a method where the thermo-dynamic property of oil is effective in maximizing the percentage of popped kernels. This thermodynamic property functions to conduct the surface temperature from the inside face of the pot, where hot spots tend to form in most metal composites, and distribute the heat evenly throughout the reservoir of the unpopped kernels. What exactly constitutes the ideal condition to be maintained by the oil is identified by *The Journal of the Royal Society Publishing* which notes that the successful popping of popcorn is "closely related to the fracture of the pericarp (outer hull). When the popcorn temperature exceeds 100° C., its water content (moisture) boils and reaches a thermodynamic equilibrium at the vapour pressure. Above a critical vapour pressure, the hull breaks. At the same time in the popcorn endosperm, the starch granules expand adiabatically and form a spongy flake of various shapes" (citation: Virot Emmanuel and Ponomarenko Alexandre. Popcorn: critical temperature, jump and sound.12. J. R. Soc. Interface http://doi.org/10.1098/rsif.2014.1247). From the authors' experimentations, they determined that the ideal temperature for the kernel to pop is approximately 180° C. or 356° F., so although it is not entirely necessary to use oil to pop the kernels, adding cooking oil would increase the uniformity of this ideal temperature, thus increase the uniformity of the vapor pressure, thus increase the uniformity of the quality of the popcorn that, if not tempered by the oil, could result in an unpopped or burnt kernel.

When selecting an oil, it is ideal to select an organic, unrefined, cold-pressed, vegetable oil with a smoke point above 180° C. or 356° F. because oil that is heated above its smoke point releases malodorous and potentially toxic substances such as aldehydes, ketones, dienes, alcohol and acids and also could muddy the pure color of the expanded starch. All of these facts and findings inform the rationale behind the material selection of cast iron for the embodiment of this pot. Cast iron is an ideal material not only for its heat retention property that keeps the contents warm long after the heat is off, but also because the continued use of oil for effectuating the aforementioned ideal popping condition contributes to a well-seasoned cast iron pot with use over time.

The single variable factor affecting the uniformity of the quality of the popped popcorn is the quality of the kernel. The common variety of corn used for making popcorn is *Zea mays* everta, a type of flint corn. Not only is *Zea mays* everta the most common variety but it is also plentiful, thus affordable, in the United States. But if there is a crack in the hull, then the optimal 13.5-14% moisture content will leak and enough pressure will not be created for the explosion.

This formational flaw, that is beyond the scope of this invention, has been identified by Virot and Ponomarenko to amount to approximately 4% of kernels remaining unpopped.

As illustrated, the result of introducing paraboloid geometry to the flat-surfaced heating element, eliminates the need to stir, crank, shake, and tilt inherent in a flat-bottomed popcorn pot, where, by shaping the path of gravity to the center of the heat to create the aforementioned ideal conditions, the percentage of popped kernels is consistently maximized. Thus, it can be concluded that the reduction of labor results in a predictably consistent, healthy, high-quality snack that is accessible to a range of physical abilities, including the physically disabled.

SUMMARY OF THE INVENTION

In one aspect of the present invention, a popcorn pot includes the following: a curvilinear body defining a paraboloid shaped cavity communicating to a cavity opening defined by an upper rim of the body; a domed lid dimensioned to engage the upper rim so as to close over the cavity opening; and an integral stabilizing footing extending away from a lower portion of the body, the footing providing a planar surface for engaging level surfaces.

In another aspect of the present invention, the popcorn pot includes the following: a cast iron curvilinear body (not limited to cast iron, but also including other non-toxic metals with a 500 degree thermal tolerance such as stainless-steel-lined-copper, stainless steel, or aluminum clad in stainless steel sheet metal) defining a paraboloid-shaped cavity communicating to a cavity opening defined by an upper rim of the body; a cast iron domed lid dimensioned to engage the upper rim so as to close over the cavity opening; a step defining a lower rim provided along an inner portion of the upper rim for fitting cooking attachments thereon; an overhang gutter extending away from the periphery of the domed lid, wherein the overhang gutter extends away from the upper lid; and an integral stabilizing footing extending away from a lower portion of the body, the footing providing a planar surface for engaging level surfaces; wherein the paraboloid-shaped cavity is an elliptical paraboloid, wherein the paraboloid-shaped cavity is defined by a radius of the cavity opening that is approximately 67-96 percent that of the vertical depth of the cavity.

In yet another aspect of the present invention, a method of popping popcorn in a cooktop pot includes the following: providing the above-mentioned popcorn pot; placing the stabilizing footing on a heating element; and adding a half-cup of un-popped kernels and two tablespoons of oil into the cavity opening, wherein said un-popped kernels and oil gravitate downward over a curvilinear inside surface, wherein the depth required for oil submersion is maximized over the center of the heating element. As the kernels begin to pop, the function of the paraboloid geometry can be further delineated into a corresponding relationship of surface and volume, 1) That the continuous curvilinear surface of the metal is thermally defined at its highest temperature at the bottom of the pot, directly over the heating element, and is thermally defined at increasing distances therefrom and 2) That the volumetric form of the cavity accounts for the change in size of the contents, where, on average, the contents expand approximately 20-50 times in size from kernel to expanded starch (citation: Helmenstine, https://www.thoughtco.com/how-does-popcorn-pop-607429). The increase in volumetric containment exists in a corresponding relationship to the thermal gradation at the surface, where the highest temperature of metal, closest to the heat, corresponds to the smallest volumetric containment of unpopped kernels; and where the increasing volume of containment therefrom corresponds to the increase in distance from the heat source. To illustrate this transition of utility over the inside surface, the volume of the cavity can be delineated into three vertical sections of containment: the lowest tier, or first section, having an average rise to run ratio of 64:137 is designed for concentration of the contents over the heat, and can be defined as where the metal can easily reach the 177-187° C. ideal popping temperature. Here the kernels begin to pop to a size that is, on average, approximately 20-50 times that of the original kernel and rapidly begin to fill the cavity of the first section, proceeding then to fill up and stack into the next larger cavity section along a smooth, uninterrupted, curvilinear inside surface. This next larger volume, or second section, having an average rise to run ratio of 64:40 can be defined as a slope of thermal containment and a cavity of proportionately increased volume, where, while the oil and kernels in the first section continue to pop and explode to a size that is, on average, approximately 20-50 times that of the original kernel, the first popped kernels continue to fill up and stack into the next larger cavity, the top, where the inside face of the surface is thermally moderated relative to its increasing distance from the heat source, preventing the expanded starch from burning. The top, or third section, having the steepest slope ratio of 64:15 also can be defined as a slope of thermal containment and a cavity of proportionately increased volume, where, while the final kernels at the bottom explode to a size that is, on average, approximately 20-50 times the size of the original kernel, the popped kernels from the second section continue to fill up and stack into the top, where the degree of metal is, as previously stated, moderated relative to its distance from the heat source, preventing the expanded starch from burning. The very top layer of popcorn is kept fluffy, warm, and crisp by way of a condensation gutter at the rim of the cavity opening, ensuring that when the lid, and/or optional spatter-guard, are/is properly removed by hinging it off, the popcorn will remain dry.

These and other features, aspects and advantages of the present invention will become better understood with reference to the following drawings, description and claims.

DETAILED DESCRIPTION OF THE INVENTION

Figure 1:
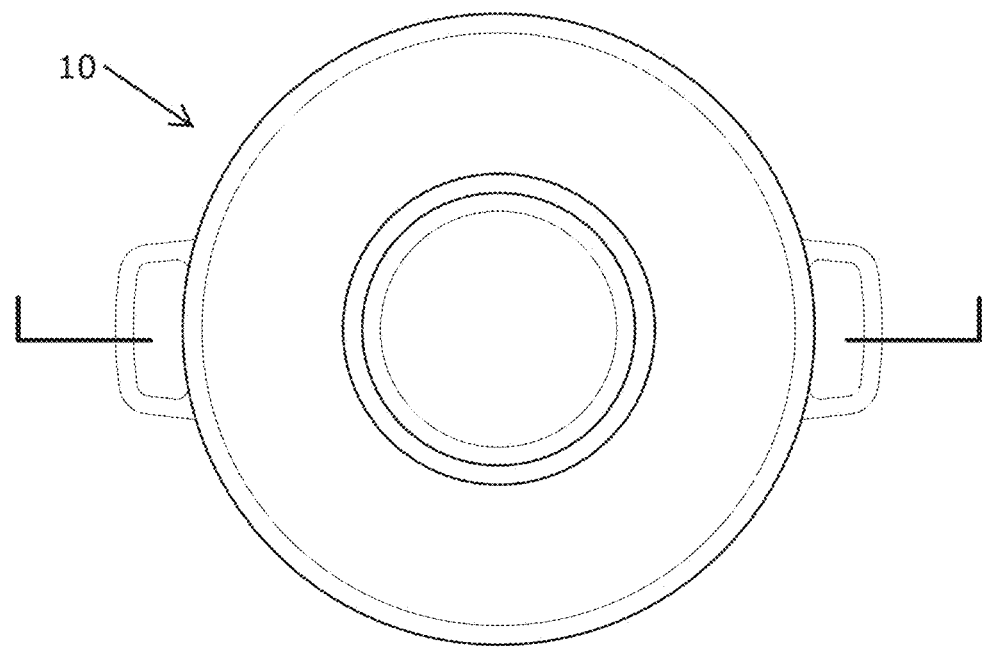
FIG. 1 is a bottom view of an exemplary embodiment of the present invention.
Figure 2:
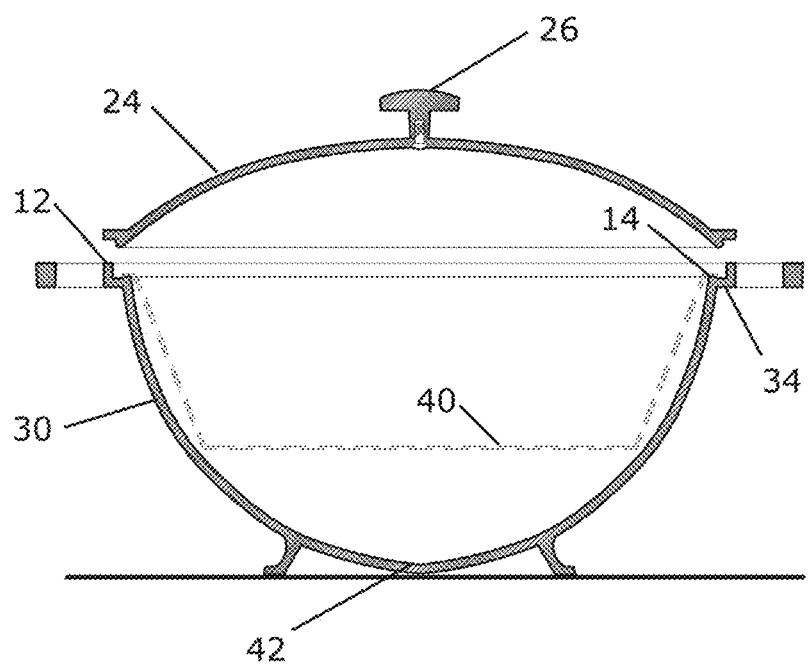
FIG. 2 is an exploded section view of an exemplary embodiment of the present invention.
Figure 3:
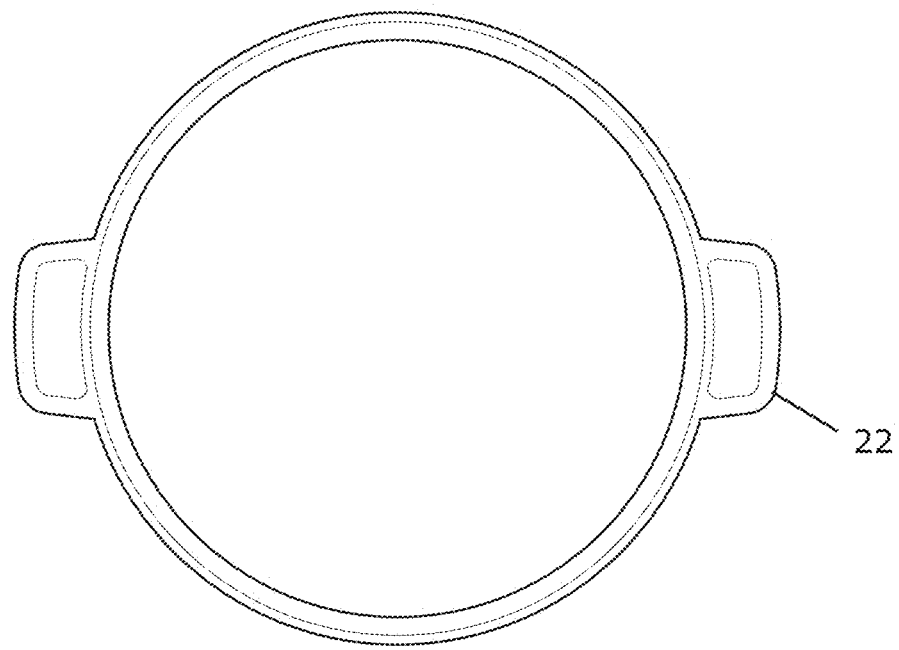
FIG. 3 is a top plan view with the lid 24 removed of an exemplary embodiment of the present invention.
Figure 4:
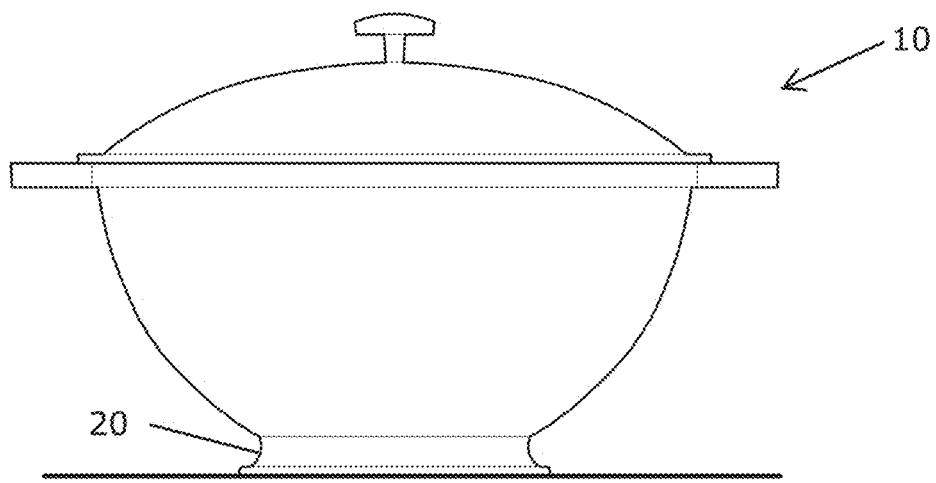
FIG. 4 is a side elevation view of an exemplary embodiment of the present invention.
Figure 5:
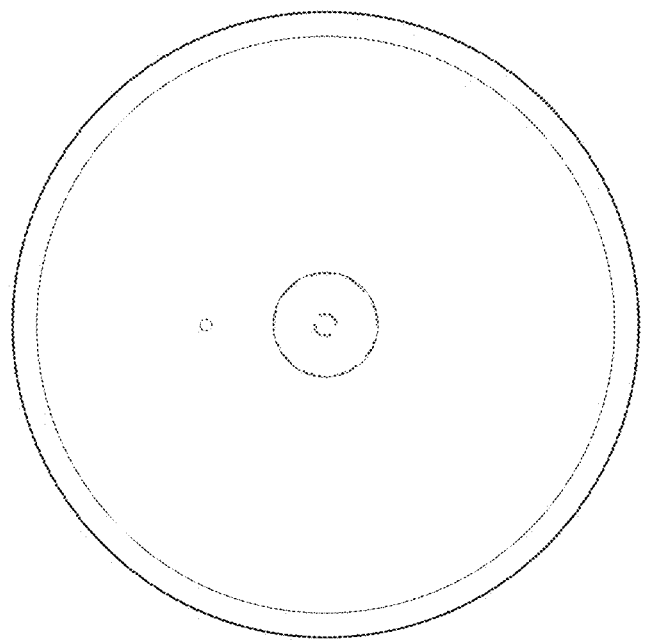
FIG. 5 is a top plan view of a lid of an exemplary embodiment of the present invention.
Figure 6:
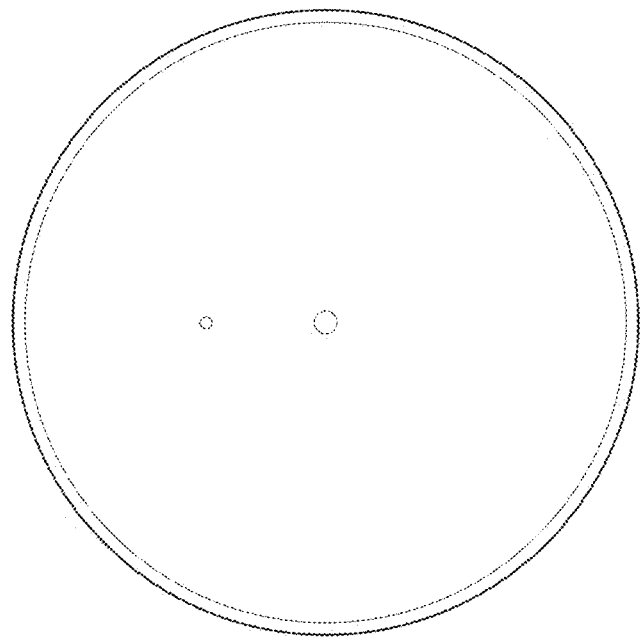
FIG. 6 is a bottom plan view of the lid of an exemplary embodiment of the present invention.

The following detailed description identifies the best currently contemplated mode of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a popcorn pot having a paraboloid-shaped cavity for gravitationally concentrating the un-popped kernels and depth of oil over the center of the heat source, thereby providing more predictable results with a method of greater efficiency than a flat-bottomed pot, while using less oil for healthier results. A footing is provided along a lower portion of the popcorn pot for stabilizing the curvilinear body on a flat-top heat source. A domed lid for covering the opening communicating to the paraboloid-shaped cavity is provided for effectuating convection heating within the cavity and providing containment.

Referring to FIGS. 1 through 7, the present invention may include a popcorn pot 10. The popcorn pot 10 may be made out of cast iron or other material having thermal conductivity properties conducive to cooking, especially popcorn, materials including other non-toxic metals with a 500-degree thermal tolerance such as stainless-steel-lined-copper, stainless steel, or aluminum clad in stainless steel sheet metal. The popcorn pot 10 has a curvilinear body 30 defining a paraboloid-shaped cavity for retaining contents such as Zea mays everta kernels and oil, wherein an upper rim 12 of the popcorn pot 10 may define a cavity opening for accessing said cavity. The upper rim 12 may include a lower rim or step 14 for fitting accessories such as a spatter-guard or a suspended roasting basket. The step 14 is gently sloped away from the cavity opening to a gutter 34, vertically aligned to catch condensation off the drip-edge 28 of the lid 24. The paraboloid-shaped cavity may be an elliptical paraboloid, wherein the radius of the cavity is slightly less than the vertical depth of the cavity opening, approximately 67 to 96 percent thereof across the eight inch, ten inch, and 12 inch diameter embodiments. For instance, the radius of the cavity opening may be six inches while the vertical depth of the cavity is six and one-quarter of an inch—in other words, the radius in this instance is approximately 96 percent of the vertical depth.

Figure 7:
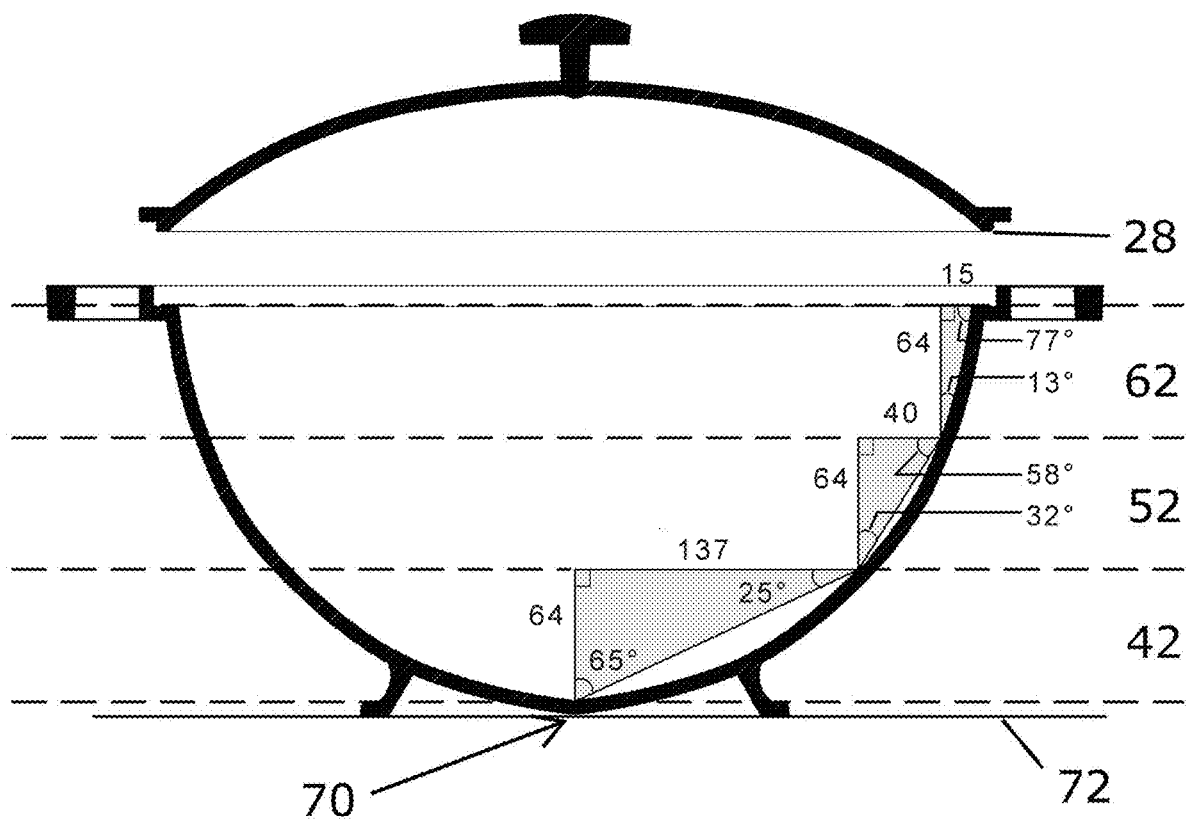
FIG. 7 is an exploded section view of an exemplary embodiment of the present invention.

Referring to FIG. 7, the curved walls of the body 30 can be viewed as a first, bottom center portion 42, a middle second portion 52, and an upper third portion 62. The overall shape of the footing 20 and the bottom center portion 42 are dimensioned and adapted so that there may be an air gap 70 (of between 1/64 to 1/16 of an inch) between a supporting surface 72. Each portion 42, 52, and 62 have their own curvature defined, in part, by their different rise-run profile. In one embodiment, the rise-run of the first bottom center portion 42 is 64:137, in the second portion 52 has a rise-run ratio of 64:40, and the third portion 62 has a rise-run ratio of 64:15.

An integral footing 20 may be provided along a bottom portion of the popcorn pot 10 for providing stabilizing support atop a flat planar surface. In certain embodiments, the footing 20, has a 6-inch diameter so that the popcorn pot 10 may be placed on conventionally-sized cooktop burners (or larger) and be stabilizing thereon. The footing 20 spans not less than 50 to 70 percent of the cavity opening across the eight inch, ten inch, and 12 inch diameter embodiments. Handles 22 may be provided along an upper portion of the popcorn pot 10. A domed lid 24 may be included, the domed lid dimensioned and adapted to engage the upper rim 12 so as to close off the cavity opening with the drip-edge aligned to the gutter 34 of step 14, with ample vertical clearance to fit the aforementioned accessories atop the lower rim or step 14. The domed lid 24 is dimensioned and adapted so that once placed on the popcorn pot 10, the domed lid 24 works as a convection shape allowing the heat to rise and circulate within the cavity. A small amount of steam can escape through a single quarter-inch diameter hole in the domed lid 24. The domed lid 24 may have a button handle 26 ergonomically designed for a secure grip and easy placement. There may be a drip-edge detail designed along the edge of the domed lid 24 so as to align a condensation gutter 34 at the step 14 along the cavity opening, the step is gently sloped to direct condensation away from the inside face thereof. The footing 20, the handles 22, the domed lid 24, and the button handle 26 may be cast iron or other material having thermal conductivity properties suitable for both cooktop and oven use, including non-toxic metals with a 500-degree thermal tolerance such as stainless-steel-lined-copper, stainless steel, or aluminum clad in stainless steel sheet metal. A flat metal-mesh screen may be included as a lighter-weight option to fit on the lower rim or step 14 of the upper rim 12 so as to reduce the spattering of oil before, or in place of, placing on the domed lid 24.

A method of using the present invention may include the following. The popcorn pot 10 disclosed above may be provided. A user may stabilize the footing 20 atop a heating element. The heating element, e.g. gas burner, may be turned on to medium-high to high heat and given time to heat while getting the ingredients ready and measured. The user may fill the cavity with kernels immediately followed by oil to coat—for example, two tablespoons of oil are added to a half-cup of Zea mays everta kernels—wherein the paraboloid shaped body 30 forms the path of gravity for the oil and kernels to follow to bottom-center 42 of the pot, closest to the heat. While the oil is heating, the optional flat metal-mesh screen 40 and/or domed lid 24 is placed on top of the pot 10.

No further action is required other than listening for popping to begin. Once the kernels begin to pop, the popped kernels naturally fill upward along the widening parabolic walls and away from the bottom center 42 of the pot, where the heat is most direct. After the rapid popping slows to greater intervals between pops, the user waits for the popping to slow down to approximately five-second intervals and then turns off the heat. Cast iron's heat retention property allows the last remaining kernels to continue to pop after the heat has been turned off and keeps the popped kernels fluffy, crisp, and warm. Wearing oven mitts, the user then removes the pot from the stove and onto a heat-safe surface. The lid and/or optional screen is/are to be removed from the pot in the manner of a hinge, such that the gutter at the stepped-lower-rim 12-14 detail of the pot catches the run-off condensation, preserving the fluffy, crisp texture of the popcorn by keeping popped kernels dry. The popcorn is best served immediately but can be kept warm in the pot and then warmed again in a low-heat oven with the domed lid 24 on. Other grains that expand when heated include sorghum, quinoa, millet, and amaranth.

Additionally, the present invention could be used for deep-frying, browning onions, and making gravy from the drippings of a round-bottom pot roast. The roast with gravy can be achieved by using the stepped-rim 12-14 detail with integral gutter at the opening of the pot 10 to hold a stainless-steel grate 40 component that is suspended down into the "belly" of the pot 10. The ten and 12 inch diameter cavity openings are designed with this intention, and could fit a whole chicken or smaller poultry/cuts of meat and fish. The smaller size diameter cavity opening, e.g. eight inch, would be better suited to single servings of poultry/meat/ fish. The egg-cup shaped bottom of the pot 10 catches the drippings at a steady boil, but also can hold a volume of water at a steady boil to maintain humidity and tenderize within the convection design of the assembled pot and lid. With the domed lid 24 off, humidity in the larger volume of the oven itself can be maintained if the user desires browned skin on top and tender meat within. Other possible flavor enhancers for the drippings include nutritious vegetables, herbs, or bouillon that could be placed in the bottom of the pot to add to the stock and flavor of the gravy component. After the roast is finished in the oven, oven mitts may be worn to place the pot upon the cooktop where the heat may be turned on and the drippings whisked into a gravy by adding thickening agents and additional flavor enhancers.

This paraboloid pot is also ideal for making French Onion soup, particularly useful for the first and last steps. The first step involves browning onions in butter (and optional oil) in the pot 10 on the cooktop for the base of the soup. The depth of butter (and optional oil) that creates a uniform temperature for the onions makes the round-bottom pot 10 ideal for browning, versus a flat-bottom pan with hot spots that, without constant attention, could burn the onions in spots. The final step of the French Onion soup recipe involves putting the pot 10 in the oven to melt and crisp the cheese on top.

In another application of use, the pot 10 and domed lid 24 are well-suited for deep-frying smaller portioned foods, pastries such as beignets and sfince, beer-battered seafood such as shrimp and scallops, vegetables such as garlic and spring onions, etc. in the depth of containment created by the paraboloid-shaped bottom. The interchangeability of cooktop and oven is suitable for cast iron, as it is oven-safe up to 500 degrees; however, in the case of deglazing, a light-colored, cadmium-free enamel coating may be a desirable development of the prototype, as deglazing agents such as wine or vinegar can strip away the seasoning that naturally develops at the surface with use over time.

It should be understood, of course, that the foregoing relates to exemplary embodiments of the invention and that modifications may be made without departing from the spirit and scope of the invention as set forth in the following claims.

What is claimed is:

1. A popcorn pot, comprising:
a body defining a paraboloid shaped cavity communicating to a cavity opening defined by an upper rim of the body;
a domed lid dimensioned to align the upper rim so as to close over the cavity opening; and
a stabilizing footing extending away from, but integral to, a lower portion of the body, wherein the diameter of the footing is no less than 50 to 70 percent of the diameter of the cavity opening, the footing providing a planar surface for engaging level surfaces, so that a bottom center portion of the body is disposed over a heat source, wherein the paraboloid-shaped cavity is defined by a radius of the cavity opening that is 67 to 96 percent that of the vertical depth of the cavity.

2. The popcorn pot of claim 1, further comprising an air space of approximately 1/32 of an inch between a lowest portion of the bottom center portion and the planar surface.

3. The popcorn pot of claim 1, further comprising:
a lower rim provided along an inner portion of the upper rim for fitting cookware accessories; and
condensation gutter circumscribing the lower rim, wherein the lower rim is slanted away from the cavity opening and toward the condensation gutter.

4. The popcorn pot of claim 1, further comprising:
a drip edge provided along a periphery of the domed lid.

5. The popcorn pot of claim 1, further comprising:
a drip edge provided along a periphery of the domed lid;
wherein a condensation gutter is vertically aligned with the drip edge when the domed lid is closed over the cavity opening.

6. The popcorn pot of claim 1, wherein the body and the domed lid is cast iron.

7. The popcorn pot of claim 1, wherein the paraboloid-shaped cavity is an elliptical paraboloid.

8. A popcorn pot, comprising:
a cast iron body defining a paraboloid shaped cavity communicating to a cavity opening defined by an upper rim of the body;
a cast iron domed lid dimensioned to engage the upper rim so as to close over the cavity opening;
a step provided along an inner portion of the upper rim for fitting optional cookware accessories thereon;
condensation gutter circumscribing the lower rim, wherein the lower rim is slanted away from the cavity opening and toward the condensation gutter; and
an integral stabilizing footing extending away from a lower portion of the body, wherein the diameter of the footing is no less than 50 to 70 percent of the diameter of the cavity opening, the footing providing a planar surface for engaging level surfaces so that a bottom center portion of the body is disposed over a heat source, wherein the paraboloid-shaped cavity is an elliptical paraboloid, wherein the paraboloid-shaped cavity is defined by a radius of the cavity opening that is approximately 67-96 percent that of the vertical depth of the cavity.

9. A method of popping popcorn in a pot, comprising:
providing the popcorn pot claimed in 8;
placing the footing on a heating element; and
placing a half-cup of un-popped kernels and two tablespoons of oil in the cavity opening, wherein said un-popped kernels and oils gravitate toward a center of the heating element.

10. A popcorn pot, comprising:
a body defining a paraboloid shaped cavity communicating to a cavity opening defined by an upper rim of the body;
a domed lid dimensioned to align the upper rim so as to close over the cavity opening; and
a stabilizing footing extending away from, but integral to, a lower portion of the body, wherein the diameter of the footing is no less than 50 to 70 percent of the diameter of the cavity opening, the footing providing a planar surface for engaging level surfaces, so that a bottom center portion of the body is disposed over a heat source,
wherein the paraboloid-shaped cavity is defined by the bottom center portion, a middle second portion, and an upper portion, wherein said portions have an approximate average rise:run ratio of 64:137, 64:40, and 64:15, respectively, that proportionately scales across various smaller diameter iterations of an embodiment.

11. The popcorn pot of claim 10, further comprising:
a lower rim provided along an inner portion of the upper rim for fitting cookware accessories; and
condensation gutter circumscribing the lower rim, wherein the lower rim is slanted away from the cavity opening and toward the condensation gutter.

12. The popcorn pot of claim 10, further comprising:
a drip edge provided along a periphery of the domed lid.

13. The popcorn pot of claim 10, further comprising:
a drip edge provided along a periphery of the domed lid;
wherein a condensation gutter is vertically aligned with the drip edge when the domed lid is closed over the cavity opening.

14. The popcorn pot of claim 10, wherein the body and the domed lid is cast iron.

15. The popcorn pot of claim 10, wherein the paraboloid-shaped cavity is an elliptical paraboloid.

16. The popcorn pot of claim 10, further comprising an air space of approximately 1/32 of an inch between a lowest portion of the bottom center portion and the planar surface.

* * * * *